Oct. 1, 1929.   G. P. LUCKEY   1,730,080
CLOUD OR FOG SOUNDING DEVICE
Filed April 11, 1923
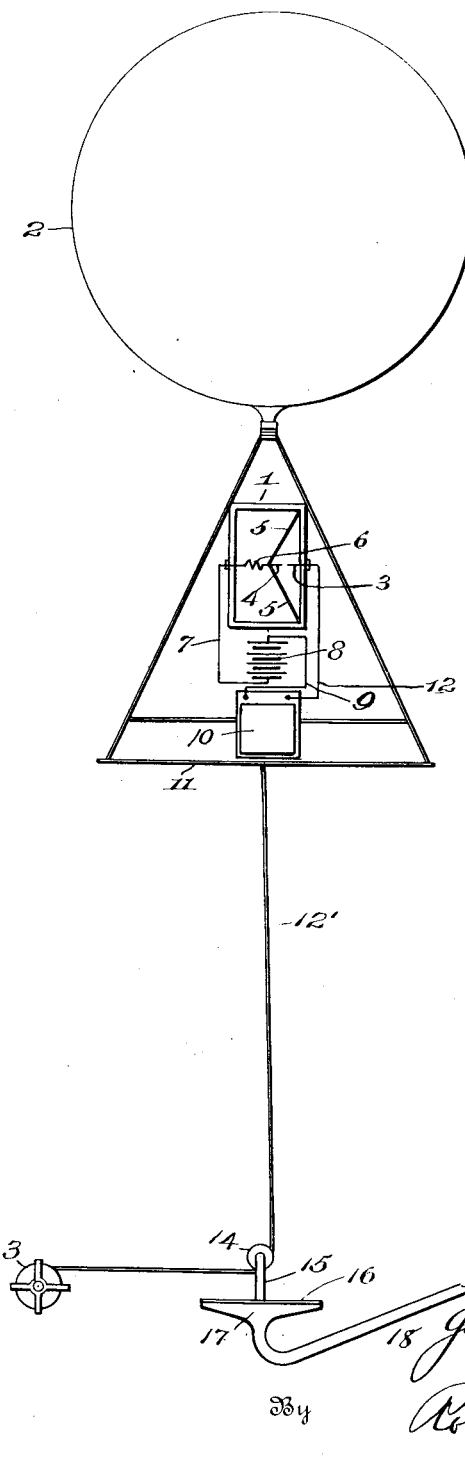

Patented Oct. 1, 1929

1,730,080

UNITED STATES PATENT OFFICE

GEORGE P. LUCKEY, OF DAYTON, OHIO

CLOUD OR FOG SOUNDING DEVICE

Application filed April 11, 1923. Serial No. 631,343.

This invention relates to a device for sounding fogs, clouds and the like and determining the depth or vertical thickness thereof.

The object of the invention is to provide simple means of the character above referred to, whereby the height or vertical dimension of a cloud or fog may be accurately determined.

To the above end the invention consists in the novel construction, combination and arrangement herein fully described, shown and claimed.

The accompanying drawing illustrates diagrammatically the improved apparatus for the purpose specified.

Referring to the drawings which illustrate one embodiment of the invention, 1 designates a frame upon which is mounted a hygrometric circuit closure, the latter being shown as suspended from and adapted to be raised to any desired altitude by a lifting device, such as a balloon 2. Mounted upon the frame there are two oppositely located electrical contacts 3 and 4, one of which is fixed and the other held under restraint by a strand or hair 5, subject to changes by the action of the atmosphere thereon. The contact 4 is further held under restraint by means of a spring 6 which will yield when the strand or hair 5 becomes taut, so as to permit the two contacts 3 and 4 to touch each other. The contacts 3 and 4 form the terminals of an electric circuit comprising a wire 7 leading to a battery 8, from which a wire 9 extends to a sounding apparatus shown as comprising a buzzer 10 or the equivalent thereof, and a diaphragm 11 which is vibrated by the buzzer. A return wire 12 extends back to the contact 3.

One end of a cord, cable or wire 12' is attached to the diaphragm 11 and said cord passes around a take-up reel 13 on the ground. The cord 12' before being wound upon the reel 13 passes around a pulley 14 or other type of guide which is attached by connection means 15 to the diaphragm 16 of a sound receiver 17 having a tube 18 leading therefrom, to which the ear of the observer may be placed.

Under the embodiment of the invention herein shown and described, when the hygrometric circuit closure reaches a point above the fog or cloud, or in other words, when it emerges from humid air into dry air, the hygrometer causes the electric circuit to be closed, thereupon sounding the buzzer or other sound producing device 10. The sound is transmitted through the cord 12' which may consist of a string, twine, rope, cable or wire and the sound is then delivered to the receiver or other listening device on the ground. The cord also serves to hold the balloon captive and the length of such cord payed out from the reel will give a measure of the distance of the balloon above the ground.

I do not desire to be restricted to the specified form, construction and arrangement of the elements employed, it being apparent that the apparatus is susceptible to a number of changes in the make-up thereof without departing from the principle of the invention herein disclosed. I therefore, reserve the right to make such changes, variations and modifications as fall within the scope of the appended claims.

I claim:

1. Apparatus for sounding the depth of clouds, fog or the like, including a hygrometric circuit closer, means for lifting the same in the air, sound producing means controlled by said circuit closer and carried by said lifting means, and a sound transmitting cord in connection with said sound producer for holding said circuit closer and its lifting means captive.

2. Apparatus for sounding the depth of clouds, fog or the like, including a hygrostat, suspension means for lifting the same in the air, an electric switch controlled by said hygrostat, sound producing means carried by said suspension means in electric circuit with said switch, a sound receiver remote from said hygrostat and a sound transmitting cord interconnecting said sound producing means and said sound receiver for holding said hygrostat and its lifting means captive.

3. Apparatus for sounding the depth of clouds, fog or the like, including a hygrometric circuit closer, a sound produced controlled by said circuit closer, a balloon supporting said circuit closer and said sound producer, a ground listening device, a sound transmitting cord connecting said sound producer and said ground listener to hold said balloon captive and means controlling the elevation of said balloon.

4. Apparatus for sounding the depth of clouds, fog or the like, comprising a hygrometric circuit closer, a sound producer, a balloon supporting said circuit closer and said sound producer, a ground listening device, a sound transmitting cord extending between said sound producer and said ground listening device to hold said balloon captive, and a pay out and take reel for said cord to control the elevation of said balloon.

In testimony whereof I affix my signature.

GEORGE P. LUCKEY.